US010053076B2

(12) United States Patent
Tanabe et al.

(10) Patent No.: US 10,053,076 B2
(45) Date of Patent: Aug. 21, 2018

(54) MASTER CYLINDER

(71) Applicant: HITACHI AUTOMOTIVE SYSTEMS, LTD., Hitachinaka-shi, Ibaraki (JP)

(72) Inventors: Seiko Tanabe, Nakakoma-gun (JP); Shinya Kasai, MinamiALPS (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 455 days.

(21) Appl. No.: 14/430,317

(22) PCT Filed: Mar. 27, 2013

(86) PCT No.: PCT/JP2013/058948
§ 371 (c)(1),
(2) Date: Mar. 23, 2015

(87) PCT Pub. No.: WO2014/069015
PCT Pub. Date: May 8, 2014

(65) Prior Publication Data
US 2015/0246664 A1    Sep. 3, 2015

(30) Foreign Application Priority Data

Oct. 31, 2012   (JP) ................................. 2012-241198

(51) Int. Cl.
*B60T 11/20*   (2006.01)
*F16J 15/32*   (2016.01)
(Continued)

(52) U.S. Cl.
CPC ............. *B60T 11/236* (2013.01); *B60T 11/16* (2013.01); *F16J 15/18* (2013.01); *F16J 15/32* (2013.01); *F16J 15/3236* (2013.01)

(58) Field of Classification Search
CPC .. F16J 15/18; F16J 15/164; F16J 15/32; F16J 15/3204; F16J 15/3232; F16J 15/3236;
(Continued)

(56) References Cited

U.S. PATENT DOCUMENTS 7,401,468 B2 *   7/2008   Mouri ..................... B60T 11/20
                                                            277/441
2008/0289330 A1   11/2008   Gaffe et al.
(Continued)

FOREIGN PATENT DOCUMENTS

DE     10 2009 052 568     5/2011
JP          9-136641       5/1997
(Continued)

OTHER PUBLICATIONS

International Search Report for PCT/JP2013/058948 dated May 7, 2013, four pages.

*Primary Examiner* — Thomas E Lazo
*Assistant Examiner* — Dustin T Nguyen
(74) *Attorney, Agent, or Firm* — Mattingly & Malur, PC

(57) ABSTRACT

A piston seal includes an annular base portion, an inner circumferential lip portion protruding from an inner circumferential side of the base portion to come in sliding contact with an outer circumferential surface of the piston, an outer circumferential lip portion protruding from an outer circumferential side of the base portion to come in contact with the circumferential groove of the cylinder main body, and an intermediate protrusion portion protruding from between the inner circumferential lip portion and the outer circumferential lip portion of the base portion further than the outer circumferential lip portion. A connecting portion is formed to extend in an axial direction of the piston seal and is configured to connect the inner circumferential lip portion and the intermediate protrusion portion is formed between
(Continued)

the inner circumferential lip portion and the intermediate protrusion portion.

10 Claims, 6 Drawing Sheets

(51) Int. Cl.
*B60T 11/236* (2006.01)
*F16J 15/3236* (2016.01)
*B60T 11/16* (2006.01)
*F16J 15/18* (2006.01)

(58) Field of Classification Search
CPC .. F16J 15/3472; F16J 15/3468; F16J 15/3464; F16J 15/3268; B60T 11/236
USPC ............... 60/588; 277/353, 436, 441, 562
See application file for complete search history.

(56) References Cited

U.S. PATENT DOCUMENTS

| | | | |
|---|---|---|---|
| 2010/0066028 A1 | 3/2010 | Aoki et al. | |
| 2010/0212313 A1 | 8/2010 | Aoki et al. | |
| 2016/0200304 A1* | 7/2016 | Owada | F16J 15/164 60/585 |

FOREIGN PATENT DOCUMENTS

| | | |
|---|---|---|
| JP | 2006-123879 | 5/2006 |
| JP | 2008-105444 | 5/2008 |
| JP | 2008-111495 | 5/2008 |
| JP | 2008-290708 | 12/2008 |

* cited by examiner

MASTER CYLINDER

BACKGROUND ART

The present invention relates to a master cylinder configured to supply a liquid pressure to a braking cylinder of a vehicle.

This application is the U.S. national phase of International Application No. PCT/JP2013/058948 filed 27 Mar. 2013 which designated the U.S. and claims priority to Japanese Patent Application No. 2012-241198, filed Oct. 31, 2012, the contents of each of which are incorporated herein by reference.

TECHNICAL FIELD

A master cylinder in which a piston seal having an inner circumferential lip portion is disposed in a circumferential groove of a cylinder main body, and the inner circumferential lip portion of the piston seal comes in sliding contact with the piston (for example, see Patent Literature 1) is known.

In addition, a master cylinder in which a cup-shaped seal and a sliding ring which contacts with a cylinder main body in a sliding manner are installed in an annular groove of a piston (for example, see Patent Literature 2) is known.

CITATION LIST

Patent Literature

[Patent Literature 1] Japanese Unexamined Patent Application, First Publication No. 2006-123879
[Patent Literature 2] Japanese Unexamined Patent Application, First Publication No. H09-136641

SUMMARY OF INVENTION

Technical Problem

Like the master cylinder disclosed in Patent Literature 1, when the piston seal is disposed in the circumferential groove of the cylinder main body and the piston comes in sliding contact with the piston seal, the inner circumferential lip portion of the piston seal may enter between the cylinder main body and the piston by movement of the piston.

The present invention provides a master cylinder capable of suppressing an inner circumferential lip portion from entering between a cylinder main body and a piston by movement of the piston.

Solution to Problem

According to a first aspect of the present invention, a master cylinder includes, a cylinder main body in a bottomed cylindrical shape including an outlet of a brake liquid and a supply path which is in communication with a reservoir, a piston that is movably disposed in the cylinder main body and that is configured to form a pressure chamber which is capable of supplying a liquid pressure into the outlet between the cylinder main body and the piston, and a piston seal that is installed in a circumferential groove formed in the cylinder main body and that is configured to seal a space between the supply path and the pressure chamber by bringing an inner circumference in sliding contact with the piston. The piston seal includes an annular base portion; an inner circumferential lip portion protruding from an inner circumference side of the base portion to come in sliding contact with an outer circumferential surface of the piston; an outer circumferential lip portion protruding from an outer circumferential side of the base portion to come in contact with the circumferential groove of the cylinder main body; and an intermediate protrusion portion protruding from between the inner circumferential lip portion and the outer circumferential lip portion of the base portion further than the outer circumferential lip portion. A connecting portion is formed to extend in an axial direction of the piston seal and is configured to connect the inner circumferential lip portion and the intermediate protrusion portion is formed between the inner circumferential lip portion and the intermediate protrusion portion.

A plurality of the connecting portions may be provided having a space in between in a circumferential direction of the base portion.

The connecting portion may be formed to extend from the base portion in a front end direction of the intermediate protrusion portion.

According to a second aspect of the present invention, a tapered surface section may be formed at an opening side of the circumferential groove in a circumferential wall of a bottom section side of the cylinder main body in the circumferential groove. A front end of the connecting portion may be disposed to face a boundary section between the tapered surface section and a wall surface section which is closer to a bottom section side of the circumferential groove than the tapered surface section of the circumferential wall.

The connecting portion may be formed to extend to at least a maximum interference area of the inner circumferential lip portion.

Advantageous Effects of Invention

According to the above-mentioned master cylinder, the inner circumferential lip portion can be suppressed from entering between the cylinder main body and the piston by movement of the piston.

DESCRIPTION OF EMBODIMENTS

Figure 1:
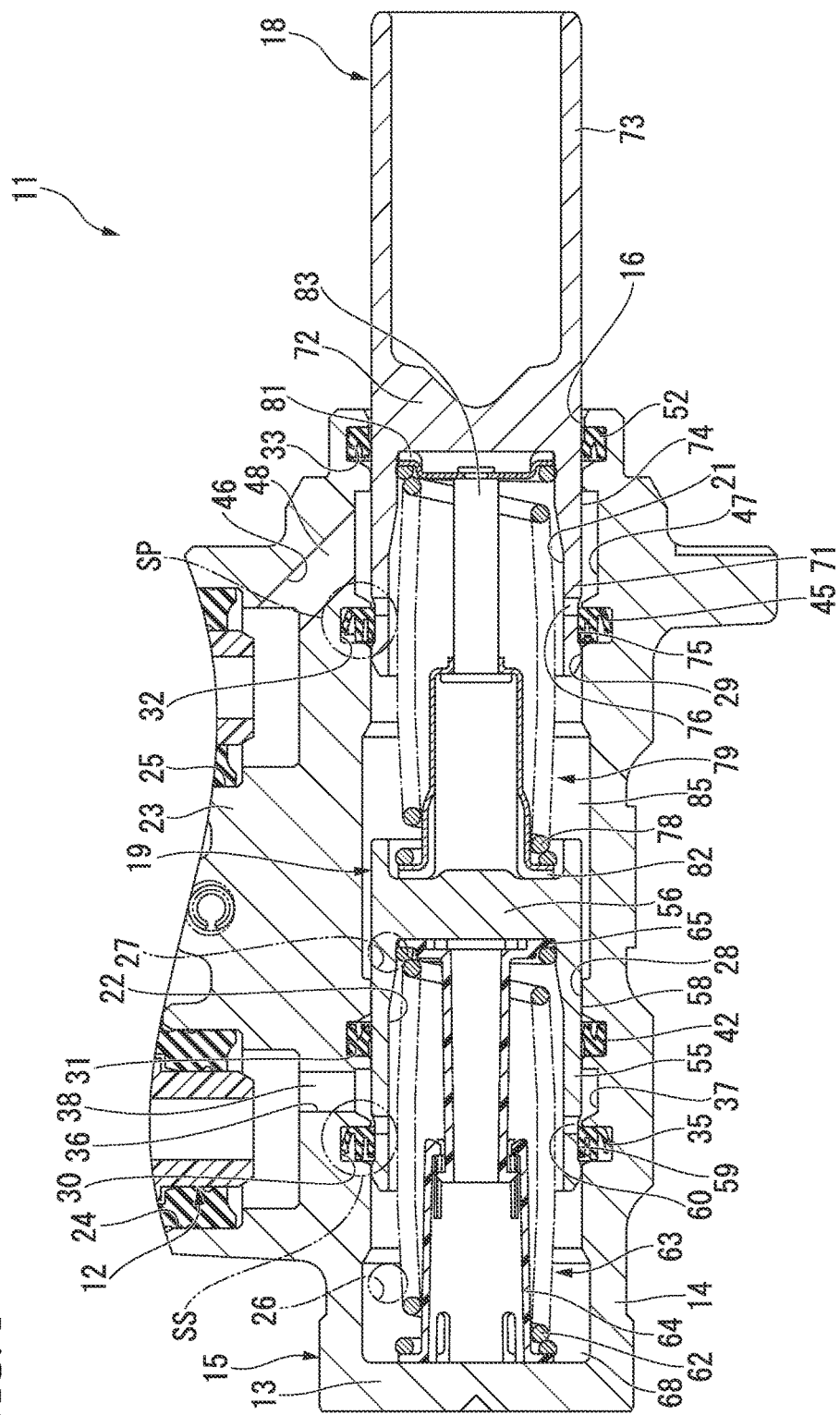
FIG. 1 is a cross-sectional view showing a master cylinder of the embodiment according to the present invention.

An embodiment according to the present invention will be described with reference to the accompanying drawings. In a master cylinder 11 of the embodiment shown in FIG. 1, a force corresponding to a manipulation amount of a brake pedal (not shown) is introduced via an output shaft of a brake booster (not shown), and a brake liquid pressure corresponding to the manipulation amount of the brake pedal is generated. In the master cylinder 11, a reservoir 12 configured to supply and discharge a brake liquid (only a part thereof is shown in FIG. 1) is attached to an upper side in a vertical direction. Further, in the embodiment, while the reservoir 12 is directly attached to the master cylinder 11, a reservoir may be disposed at a position spaced apart from the master cylinder 11, and the reservoir and the master cylinder 11 may be connected by a pipe.

The master cylinder 11 has a metal cylinder main body 15 formed by processing a material in a bottomed cylindrical shape having a bottom section 13 and a tubular section 14. The cylinder main body 15 is disposed in a vehicle with a posture in which an axial direction is disposed in forward and rearward directions of the vehicle. A primary piston (a piston) 18 formed of a metal is movably disposed at an opening section 16 side of the cylinder main body 15. In addition, a secondary piston (a piston) 19 formed of the same metal is movably disposed closer to the bottom section 13 than the primary piston 18 of the cylinder main body 15. An inner circumferential hole 21 having a bottom surface is formed at the primary piston 18. An inner circumferential hole 22 having a bottom surface is formed at the secondary piston 19. The master cylinder 11 is a so-called plunger type. In addition, the master cylinder 11 is a tandem type master cylinder having the above-mentioned two pistons 18 and 19. Further, the embodiment is not limited to an application to the tandem type master cylinder but may also be applied to a plunger type master cylinder such as, for example, a single type master cylinder having one piston disposed in a cylinder main body, a master cylinder having three or more pistons, or the like, as long as the master cylinder is the plunger type master cylinder.

An attachment section 23 protruding outward in a radial direction of the tubular section 14 (hereinafter, referred to as a cylinder radial direction) is integrally formed with the cylinder main body 15 at a predetermined position in a circumferential direction of the tubular section 14 (hereinafter, referred to as a cylinder circumferential direction). Attachment holes 24 and 25 configured to attach the reservoir 12 are formed in the attachment section 23. Further, in the embodiment, the attachment holes 24 and 25 are formed at an upper section at offset positions in a direction of an axis (hereinafter, referred to as a cylinder axis) of the tubular section 14 of the cylinder main body 15 in a state in which positions in the cylinder circumferential direction coincide with each other.

A secondary outlet (an outlet) 26 in the vicinity of the bottom section 13 is formed at the attachment section 23 side of the tubular section 14 of the cylinder main body 15. A primary outlet (an outlet) 27 is formed closer to the opening section 16 than the secondary outlet (the outlet) 26. The secondary outlet 26 and the primary outlet 27, while not shown, come in communication with a braking cylinder such as a disk brake, a drum brake, or the like, via a brake pipe, and eject a brake liquid toward the braking cylinder. Further, in the embodiment, the secondary outlet 26 and the primary outlet 27 are formed at offset positions in the cylinder axial direction in a state in which positions in the cylinder circumferential direction coincide with each other.

The secondary piston 19 is slidably guided by a sliding inner diameter section 28 which is formed at an inner circumferential portion of the bottom section 13 side of the tubular section 14 of the cylinder main body 15 and having a cylindrical surface shape about a cylinder axis. The primary piston 18 is slidably guided by a sliding inner diameter section 29 which is formed at an inner circumferential portion of the opening section 16 side of the tubular section 14 of the cylinder main body 15 and having a cylindrical surface shape about the cylinder axis.

A plurality of, specifically two, grooves, i.e., a circumferential groove 30 and a circumferential groove 31, both of which have an annular shape, are formed at the sliding inner diameter section 28 in sequence from the bottom section 13 side at offset positions in the cylinder axial direction. In addition, a plurality of, specifically two, grooves, i.e., a circumferential groove 32 and a circumferential groove 33, both of which have an annular shape, are also formed at the sliding inner diameter section 29 in sequence from the bottom section 13 side at offset positions in the cylinder axial direction. The circumferential grooves 30 to 33 are formed in an annular shape in the cylinder circumferential direction and formed in a concave shape outside in the cylinder radial direction. All of the circumferential grooves 30 to 33 are formed through cutting work.

The circumferential groove 30, closest to the bottom section 13, is formed in the vicinity of the attachment hole 24, close to the bottom section 13, among the attachment holes 24 and 25. A piston seal 35 having an annular shape is disposed in the circumferential groove 30 to be held in the circumferential groove 30.

An annular opening groove 37 concaved outside in the cylinder radial direction is formed closer to the opening section 16 than the circumferential groove 30 in the sliding inner diameter section 28 of the cylinder main body 15 such that a communication hole 36 drilled from the attachment hole 24 from the bottom section 13 side is opened in the tubular section 14. Here, the opening groove 37 and the communication hole 36 are formed in the cylinder main body 15 to mainly constitute a secondary supply path (a supply path) 38 in normal communication with the reservoir 12.

A communication groove (not shown) opened in the circumferential groove 30 and linearly extending from the circumferential groove 30 toward the bottom section 13 in the cylinder axial direction is formed in the sliding inner diameter section 28 of the cylinder main body 15 to be concaved outside in the cylinder radial direction. The communication groove brings the secondary outlet 26 and the circumferential groove 30, which are formed at positions in the vicinity of the bottom section 13 between the bottom section 13 and the circumferential groove 30, in communication with each other via a secondary pressure chamber 68 which will be detailed later.

The circumferential groove 31 is formed in the sliding inner diameter section 28 of the cylinder main body 15 at an opposite side of the circumferential groove 30 of the opening groove 37 in the cylinder axial direction, i.e., the opening section 16 side. A division seal 42 having an annular shape is disposed in the circumferential groove 31 to be held in the circumferential groove 31.

The circumferential groove 32 is formed in the sliding inner diameter section 29 of the cylinder main body 15 at a position close to the attachment hole 25 of the opening section 16 side. A piston seal 45 having an annular shape is disposed in the circumferential groove 32 to be held in the circumferential groove 32.

An annular opening groove 47 concaved outside in the cylinder radial direction is formed at the opening section 16 side of the circumferential groove 32 in the sliding inner diameter section 29 of the cylinder main body 15 such that a communication hole 46 drilled from the attachment hole 25 of the opening section 16 side is opened in the tubular section 14. Here, the opening groove 47 and the communication hole 46 mainly constitute a primary supply path (a supply path) 48 in normal communication with the reservoir 12 installed at the cylinder main body 15.

A communication groove (not shown) opened in the circumferential groove 32 and linearly extending from the circumferential groove 32 toward the bottom section 13 in the cylinder axial direction is formed at the bottom section 13 side of the circumferential groove 32 of the sliding inner diameter section 29 of the cylinder main body 15 to be concaved outside in the cylinder radial direction. The communication groove brings the primary outlet 27 and the circumferential groove 32 formed at positions in the vicinity of the circumferential groove 31 in communication with each other via a primary pressure chamber 85 which will be detailed later.

The circumferential groove 33 is formed at an opposite side of the circumferential groove 32 of the opening groove 47 in the sliding inner diameter section 29 of the cylinder main body 15, i.e., the opening section 16 side. A division seal 52 having an annular shape is disposed in the circumferential groove 33 to be held in the circumferential groove 33.

The secondary piston 19 fitted into the bottom section 13 side of the cylinder main body 15 forms a bottomed cylindrical shape having a cylindrical section 55 and a bottom section 56 formed at one side in the axial direction of the cylindrical section 55. The inner circumferential hole 22 is formed by the cylindrical section 55 and the bottom section 56. The secondary piston 19 is slidably fitted into an inner circumference of the piston seal 35 and the division seal 42 is installed at the sliding inner diameter section 28 of the cylinder main body 15 in a state in which the cylindrical section 55 is disposed at the bottom section 13 side of the cylinder main body 15. An annular stepped section 59 forming a stepped shape is formed at an outer circumferential portion of an opposite end side with respect to the bottom section 56 of the cylindrical section 55 so as to be positioned more inside in the radial direction than an outer diameter section 58 having a maximum diameter in the secondary piston 19. A plurality of ports 60 passing in the cylinder radial direction at the bottom section 56 side are formed at the stepped section 59 at equal intervals in the cylinder circumferential direction to form a radial shape.

An interval adjustment unit 63 including a secondary piston spring 62, which is configured to determine of the intervals in a non-braking state in which there is no input from a brake pedal side (not shown) (at a right side of FIG. 1), is installed between the secondary piston 19 and the bottom section 13 of the cylinder main body 15. The interval adjustment unit 63 has a locking member 64 abutting the bottom section 13 of the cylinder main body 15, and a locking member 65 connected to the locking member 64 to be slid within only a predetermined range and abutting the bottom section 56 of the secondary piston 19. The secondary piston spring 62 is interposed between the locking members 64 and 65 of both sides.

Here, a portion formed as being surrounded by the bottom section 13 of the cylinder main body 15, the bottom section 13 side of the tubular section 14 and the secondary piston 19 becomes the secondary pressure chamber (the pressure chamber) 68 configured to generate a brake liquid pressure and supply the brake liquid pressure to the secondary outlet 26. In other words, the secondary piston 19 forms the secondary pressure chamber 68 which is disposed between the cylinder main body 15 and the secondary piston 19 and which is configured to supply a liquid pressure to the secondary outlet 26. The secondary pressure chamber 68 comes in communication with the secondary supply path 38, i.e., the reservoir 12 when the secondary piston 19 is disposed at a position at which the port 60 is opened in the opening groove 37.

The division seal 42 held in the circumferential groove 31 of the cylinder main body 15 is an integrally formed product formed of synthetic rubber. In the division seal 42, one side shape of a cross-section in a radial direction including a centerline thereof becomes a C shape. In the division seal 42, the inner circumference comes in sliding contact with an outer circumference of the secondary piston 19 moving in the cylinder axial direction, and the outer circumference abuts the circumferential groove 31 of the cylinder main body 15 to normally seal a gap between positions of the secondary piston 19 and the division seal 42 of the cylinder main body 15.

The piston seal 35 held in the circumferential groove 30 of the cylinder main body 15 is an integrally formed product formed of synthetic rubber such as EPDM or the like. In the piston seal 35, the inner circumference comes in sliding contact with the outer circumference of the secondary piston 19 moving in the cylinder axial direction, and the outer circumference is configured to abut the circumferential groove 30 of the cylinder main body 15. The piston seal 35 can seal a space between the secondary supply path 38 and the secondary pressure chamber 68 in a state in which the secondary piston 19 disposes the port 60 at a position closer to the bottom section 13 than the piston seal 35, i.e., can block communication between the secondary pressure chamber 68, the secondary supply path 38 and the reservoir 12. In this state, as the secondary piston 19 slides toward the bottom section 13 at the inside of the inner circumference of the sliding inner diameter section 28 of the cylinder main body 15, the piston seal 35 and the division seal 42 which are held in the cylinder main body 15, the brake liquid in the secondary pressure chamber 68 is compressed to be supplied from the secondary outlet 26 toward the braking cylinder at a wheel side.

Further, when there is no input from brake pedal side (not shown) and the above-mentioned secondary piston 19 is disposed at the position (the non-braking position) at which the port 60 is opened in the opening groove 37 as shown in FIG. 1, a part of the piston seal 35 overlaps the port 60 in the stepped section 59 of the secondary piston 19. Then, when the secondary piston 19 moves toward the bottom section 13 of the cylinder main body 15 and the inner circumferential portion of the piston seal 35 entirely overlaps the port 60, communication between the secondary pressure chamber 68 and the reservoir 12 is blocked.

The primary piston 18 fitted into the opening section 16 side of the cylinder main body 15 is formed to have a first cylindrical section 71, a bottom section 72 formed at one side in the axial direction of the first cylindrical section 71, and a second cylindrical section 73 formed at an opposite side of the first cylindrical section 71 of the bottom section 72. The inner circumferential hole 21 is formed by the first cylindrical section 71 and the bottom section 72 among these sections. The primary piston 18 is slidably fitted into the inner circumference of the piston seal 45 and the division seal 52 installed in the sliding inner diameter section 29 of the cylinder main body 15 in a state in which the first cylindrical section 71 is disposed at the secondary piston 19 side in the cylinder main body 15. Here, an output shaft of the brake booster is inserted into the second cylindrical section 73, and the bottom section 72 is pressed by the output shaft.

An annular stepped section 75 having a stepped shape is formed at an outer circumferential portion of an opposite end side with respect to the bottom section 72 of the first cylindrical section 71 so as to be positioned more inside in the radial direction than an outer diameter section 74 having a maximum diameter in the primary piston 18. A plurality of ports 76 passing in the radial direction at the bottom section 72 are formed at the stepped section 75 at equal intervals in the cylinder circumferential direction to form a radial shape.

An interval adjustment unit 79 including a primary piston spring 78, which is configured to determine the intervals in the non-braking state in which there is no input from the brake pedal side (not shown) (a right side in FIG. 1), is formed between the secondary piston 19 and the primary piston 18. The interval adjustment unit 79 has a locking member 81 abutting the bottom section 72 of the primary piston 18, a locking member 82 abutting the bottom section 56 of the secondary piston 19, and a shaft member 83 having one end section fixed to the locking member 81 and configured to slidably support the locking member 82 within only a predetermined range. The primary piston spring 78 is interposed between the locking members 81 and 82 of both sides.

Here, a portion formed as being surrounded by the tubular section 14 of the cylinder main body 15, the primary piston 18 and the secondary piston 19 becomes the primary pressure chamber (the pressure chamber) 85 configured to generate the brake liquid pressure to supply the brake liquid to the primary outlet 27. In other words, the primary piston 18 forms the primary pressure chamber 85 which is disposed between the secondary piston 19 and the cylinder main body 15 and which is configured to supply the liquid pressure to the primary outlet 27. The primary pressure chamber 85 is configured to come in communication with the primary supply path 48, i.e., the reservoir 12 when the primary piston 18 is disposed at a position at which the port 76 is opened in the opening groove 47.

The division seal 52 held in the circumferential groove 33 of the cylinder main body 15 is the same part as the division seal 42, and an integrally formed product formed of synthetic rubber. The division seal 52 has one side shape of a cross-section in the radial direction including a centerline thereof that forms a C shape. In the division seal 52, the inner circumference comes in sliding contact with the outer circumference of the primary piston 18 moving in the cylinder axial direction, and the outer circumference abuts the circumferential groove 33 of the cylinder main body 15 to normally seal a gap between positions of the primary piston 18 and the division seal 52 of the cylinder main body 15.

The piston seal 45 held in the circumferential groove 32 of the cylinder main body 15 is the same part as the piston seal 35, and an integrally formed product formed of synthetic rubber. In the piston seal 45, the inner circumference comes in sliding contact with the outer circumference of the primary piston 18 moving in the cylinder axial direction, and the outer circumference is configured to abut the circumferential groove 32 of the cylinder main body 15. The piston seal 45 can seal a space between the primary supply path 48 and the primary pressure chamber 85 in a state in which the primary piston 18 disposes the port 76 closer to the bottom section 13 than the piston seal 45, i.e., can block communication between the primary pressure chamber 85, the primary supply path 48 and the reservoir 12. In this state, as the primary piston 18 slides toward the bottom section 13 at the inner circumference of the sliding inner diameter section 29 of the cylinder main body 15 and the piston seal 45 and the division seal 52 which are held in the cylinder main body 15, the brake liquid in the primary pressure chamber 85 is compressed to be supplied from the primary outlet 27 toward the braking cylinder at the wheel side.

Further, when there is no input from the brake pedal side (not shown) and the above-mentioned primary piston 18 is disposed at a position (a non-braking position) at which the port 76 is opened in the opening groove 47 as shown in FIG. 1, a part of the piston seal 45 overlaps the port 76 in the stepped section 75 of the primary piston 18. Then, when the primary piston 18 moves toward the bottom section 13 of the cylinder main body 15 and the inner circumferential portion of the piston seal 45 entirely overlaps the port 76, communication between the primary pressure chamber 85 and the reservoir 12 is blocked.

A seal structure SS of a secondary side constituted by the circumferential groove 30 of the cylinder main body 15 and a neighboring portion thereof, the piston seal 35, and a sliding contact area of the piston seal 35 of the secondary piston 19 has the same structure as a seal structure SP of a primary side constituted by the circumferential groove 32 of the cylinder main body 15 and a neighboring portion thereof, the piston seal 45, and a sliding contact area of the piston seal 45 of the primary piston 18. Accordingly, hereinafter, details of these will be mainly described with reference to FIGS. 2 to 7 while exemplifying the seal structure SP of the primary side.

Figure 2:
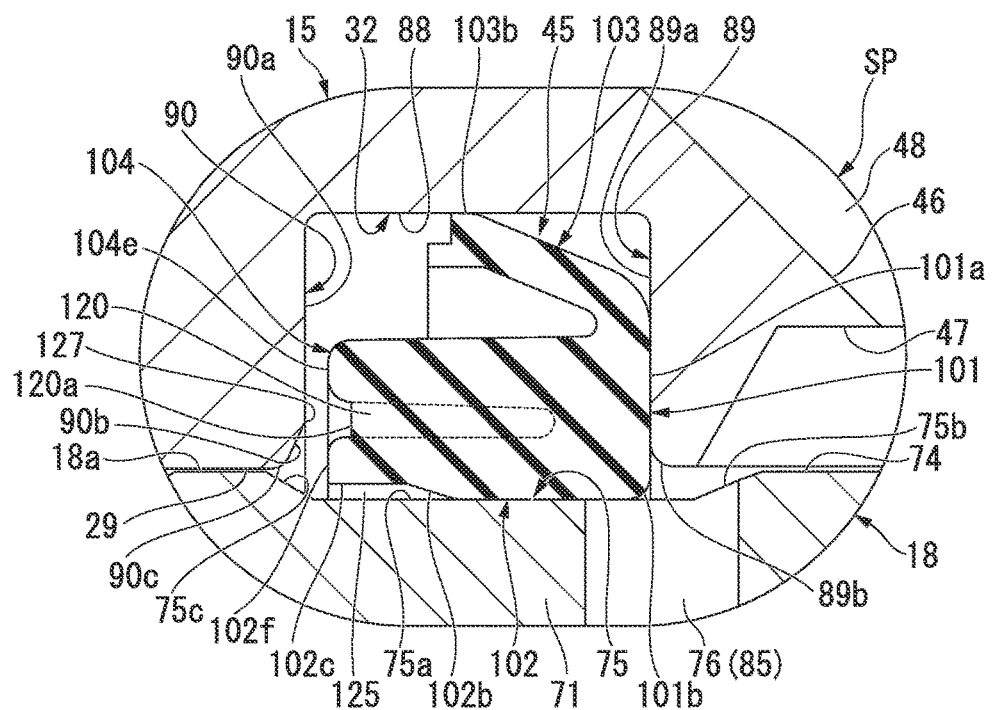
FIG. 2 is a partially enlarged cross-sectional view showing major parts of the master cylinder of the embodiment of the present invention, showing a state in which a piston is at a basic position.

As shown in FIG. 2, the circumferential groove 32 has a groove bottom section (a bottom section of the circumferential groove 32) 88 disposed at the outermost side (an upper side in FIG. 2) in the cylinder radial direction and having a cylindrical surface shape about the cylinder axis, a circumferential wall 89 extending inward in the cylinder radial direction along a direction perpendicular to the cylinder axis from an edge section of the opening section 16 side (a right side in FIG. 2) of the cylinder main body 15 in the groove bottom section 88, and a circumferential wall 90 extending inward in the cylinder radial direction along a direction perpendicular to the cylinder axis from an edge section of the bottom section 13 side (a left side in FIG. 2) of the cylinder main body 15 in the groove bottom section 88. The groove bottom section 88, the circumferential wall 89 and the circumferential wall 90 are integrally formed with the cylinder main body 15, and formed by a cutting work with respect to the cylinder main body 15.

The circumferential wall 89 has a flat surface section 89a formed of a flat surface parallel to a surface perpendicular to the cylinder axis, and an R chamfered section 89b installed more inside in the cylinder radial direction than the flat surface section 89a. The flat surface section 89a has a constant width in the cylinder radial direction with a constant inner diameter and a constant outer diameter, and forms an annular shape about the cylinder axis.

The R chamfered section 89b extends to be inclined with respect to the cylinder axial direction so that the more inner side in the cylinder radial direction from the inner edge section in the cylinder radial direction of the flat surface section 89a is positioned at more opening section 16 side of the cylinder main body 15. The R chamfered section 89b forms an arc shape in which a cross-sectional shape including the cylinder axis has a center outside the circumferential groove 32. The R chamfered section 89b forms an annular shape about the cylinder axis, and the inner edge section in the cylinder radial direction is connected to a portion of the sliding inner diameter section 29 closer to the opening section 16 (the right side in FIG. 2) than the circumferential groove 32.

The circumferential wall 90 opposite to the circumferential wall 89 has a flat surface section (a wall surface section) 90a constituted by a flat surface parallel to a surface perpendicular to the cylinder axis, a tapered surface section 90b formed more inside in the cylinder radial direction than the flat surface section 90a, and an R chamfered section 90c formed more inside in the cylinder radial direction than the tapered surface section 90b. The flat surface section 90a has a constant width in the cylinder radial direction with a constant inner diameter and a constant outer diameter, and forms an annular shape about the cylinder axis.

The tapered surface section 90b extends to form a tapered shape about the cylinder axis to have a diameter reduced as approaching the bottom section 13 from the inner edge section in the cylinder radial direction of the flat surface section 90a toward the bottom section 13 (the left side in FIG. 2) in the cylinder axial direction. The tapered surface section 90b is formed at an opening side (inward in the radial direction) of the circumferential groove 32 in the circumferential wall 90 at the bottom section 13 side (the left side in FIG. 2) of the cylinder main body 15 of the circumferential groove 32. The flat surface section 90a is formed next to the groove bottom section 88 in the cylinder radial direction of the tapered surface section 90b. A maximum diameter of the tapered surface section 90b is larger than a minimum diameter of the flat surface section 89a of the circumferential wall 89. An angle of the tapered surface section 90b formed with respect to the flat surface section 90a becomes an obtuse angle.

The R chamfered section 90c extends to be inclined with respect to the cylinder axial direction so that the more inner side in the cylinder radial direction from the inner edge section in the cylinder radial direction of the tapered surface section 90b is positioned at more bottom section 13 side of the cylinder main body 15. The R chamfered section 90c forms an arc shape in which a cross-sectional shape including the cylinder axis has a center outside the circumferential groove 32. The R chamfered section 90c forms an annular shape about the cylinder axis as a whole, and the inner edge section in the cylinder radial direction is connected to a portion of the sliding inner diameter section 29 closer to the bottom section 13 (the left side in FIG. 2) than the circumferential groove 32.

The stepped section 75 formed at the primary piston 18 is constituted by a cylindrical surface section 75a formed to have a constant diameter smaller than the outer diameter section 74 of the cylindrical surface shape having a maximum diameter in the primary piston 18, a tapered surface section 75b extending to be inclined to have a diameter which increases from the edge section at the opening section 16 side (the right side in FIG. 2) of the cylinder main body 15 of the cylindrical surface section 75a toward the opening section 16 of the cylinder main body 15, and a tapered surface section 75c extending to be inclined to have a diameter which increases from the edge section of the bottom section 13 side (the left side in FIG. 2) of the cylinder main body 15 of the cylindrical surface section 75a toward the bottom section 13 of the cylinder main body 15.

The cylindrical surface section 75a, the tapered surface section 75b and the tapered surface section 75c are formed about the central axis of the primary piston 18 similar to the outer diameter section 74. Each of the large diameter side of the tapered surface section 75b and the large diameter side of the tapered surface section 75c are connected to the outer diameter section 74. The port 76 in normal communication with the primary pressure chamber 85 is formed at a position crossing both of the cylindrical surface section 75a and the tapered surface section 75b. In other words, the end section at the bottom section 13 side (the left side in FIG. 2) of the cylinder main body 15 of the port 76 is disposed at the cylindrical surface section 75a. The end section at the opening section 16 side of the cylinder main body 15 of the port 76 is disposed at the tapered surface section 75b.

Figure 3A:
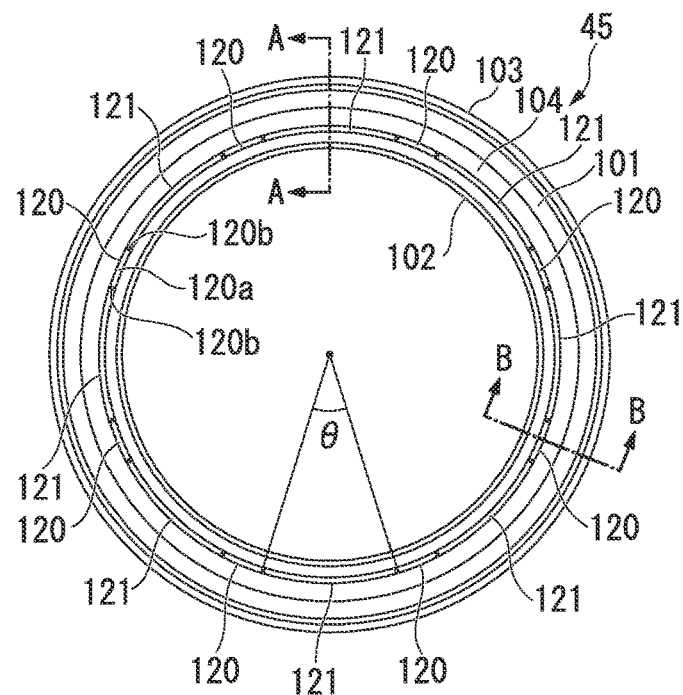
FIG. 3A is a front view showing a piston seal of the master cylinder of the embodiment of the present invention.
Figure 3B:
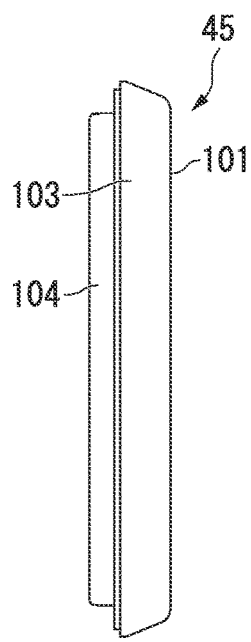
FIG. 3B is a side view showing the piston seal of the master cylinder of the embodiment of the present invention.

The piston seal 45 disposed at the circumferential groove 32 is an integrally formed product formed of synthetic rubber such as EPDM or the like. The piston seal 45 has a base portion 101 having an annular plate shape disposed at the opening section 16 side (the right side in FIG. 2) of the cylinder main body 15, an inner circumferential lip portion 102 having an annular cylinder shape protruding from an inner circumferential end of the base portion 101 toward the bottom section 13 side (the left side in FIG. 2) of the cylinder main body 15 in the axial direction of the base portion 101, an outer circumferential lip portion 103 having an annular cylinder shape protruding from the outer circumferential end of the base portion 101 toward the bottom section 13 (the left side in FIG. 2) of the cylinder main body 15, and an intermediate protrusion portion 104 having an annular cylinder shape protruding further than the outer circumferential lip portion 103 from the base portion 101 toward the bottom section 13 side (the left side in FIG. 2) of the cylinder main body 15 between the outer circumferential lip portion 103 and the inner circumferential lip portion 102. As shown in FIG. 3A, central axes of the base portion 101, the inner circumferential lip portion 102, the outer circumferential lip portion 103 and the intermediate protrusion portion 104 coincide with each other. The central axes become a central axis of the piston seal 45. As shown in FIG. 2, in the piston seal 45, the inner circumferential lip portion 102 comes in sliding contact with an outer circumferential surface 18a of the primary piston 18 moving in the cylinder axial direction. The outer circumferential lip portion 103 abuts the circumferential groove 32 of the cylinder main body 15.

The piston seal 45 in a natural state before combined with the master cylinder 11 will be described with reference to FIGS. 3A, 3B, 4A and 4B.

Figure 4A:
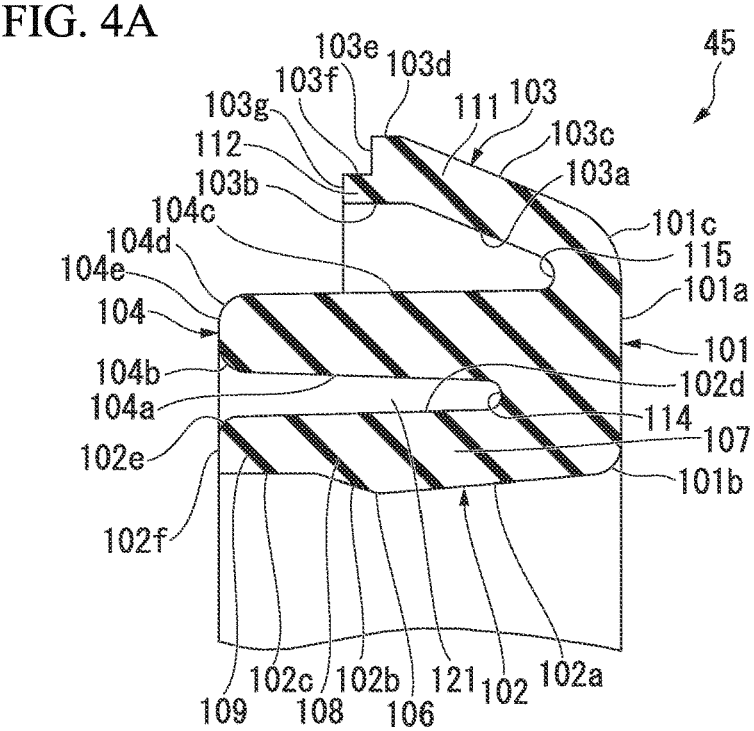
FIG. 4A is a cross-sectional view taken along line A-A of FIG. 3A, showing the piston seal of the master cylinder of the embodiment of the present invention.

As shown in FIG. 4A, in the base portion 101, a rear surface section 101a serving as an edge surface at a side opposite to the protrusion direction of the inner circumferential lip portion 102, the outer circumferential lip portion 103 and the intermediate protrusion portion 104 is parallel to a surface perpendicular to an axis of the piston seal 45. The rear surface section 101a has a constant width in the radial direction with a constant inner diameter and a constant outer diameter, and forms an annular shape about a central axis of the piston seal 45.

In addition, an R chamfered section 101b of the base portion 101 is formed inside in the radial direction of the rear surface section 101a. An R chamfered section 101c is formed outside in the radial direction of the rear surface section 101a. The R chamfered section 101b extends to be inclined with respect to the central axis of the piston seal 45 so that, as it is separated inward in the radial direction from the rear surface section 101a at the inner edge section in the radial direction of the rear surface section 101a, the R chamfered section 101b is positioned at more inner circumferential lip portion 102 side in the axis direction. The R chamfered section 101b forms an arc shape in which a cross-sectional shape including the central axis of the piston seal 45 has a center inside the base portion 101. The R chamfered section 101b forms an annular shape about the central axis of the piston seal 45 as a whole. The R chamfered section 101c extends to be inclined with respect to the central axis of the piston seal 45 so that, as it is separated outward in the radial direction from the rear surface section 101a at the inner edge section in the radial direction of the rear surface section 101a, the R chamfered section 101c is positioned at more outer circumferential lip portion 103 side in the axis direction. The R chamfered section 101c forms an arc shape in which a cross-sectional shape including the central axis of the piston seal 45 has a center inside the base portion 101. The R chamfered section 101c forms an annular shape about the central axis of the piston seal 45 as a whole.

The inner circumferential lip portion 102 forms a tapered shape having a diameter slightly reduced as being spaced apart from the base portion 101 in the axial direction as a whole. A diameter-reduced inner circumferential surface section 102a, a diameter-increased inner circumferential surface section 102b and a cylindrical inner circumferential surface section 102c are formed at the inner circumferential side of the inner circumferential lip portion 102 in sequence from the base portion 101 side in the axial direction. The diameter-reduced inner circumferential surface section 102a extends from the inner edge section, in the radial direction of the piston seal 45, of the R chamfered section 101b of the base portion 101 to form a tapered shape about the central axis of the piston seal 45 so that the diameter of the diameter-reduced inner circumferential surface section 102a becomes a smaller diameter (i.e., the diameter is reduced) as being spaced apart from the base portion 101 in the axial direction. The diameter-increased inner circumferential surface section 102b extends from the edge section of an opposite side of the base portion 101 of the diameter-reduced inner circumferential surface section 102a to form a tapered shape about the central axis of the piston seal 45 so that the diameter of the diameter-increased inner circumferential surface section 102b becomes a larger diameter (i.e., the diameter is increased) as being spaced apart from the base portion 101 in the axial direction. The cylindrical inner circumferential surface section 102c extends from the edge section of an opposite side of the base portion 101 of the diameter-increased inner circumferential surface section 102b to form a cylindrical surface shape about the central axis of the piston seal 45.

A diameter-reduced outer circumferential surface section 102d and an R chamfered section 102e are formed at the outer circumferential side of the inner circumferential lip portion 102 in sequence from the base portion 101 side in the axial direction. The diameter-reduced outer circumferential surface section 102d extends to form a tapered shape about the central axis of the piston seal 45 to have a diameter slightly reduced as being spaced apart from the base portion 101 in the axial direction. The R chamfered section 102e extends from the edge section, of an opposite side of the base portion 101 of the diameter-reduced outer circumferential surface section 102d to be inclined with respect to the central axis of the piston seal 45 to have a diameter reduced as being spaced apart from the base portion 101 in the axial direction. The R chamfered section 102e has an arc shape in which a cross-sectional shape including the central axis of the piston seal 45 has a center inside the inner circumferential lip portion 102. The R chamfered section 102e forms an annular shape about the central axis of the piston seal 45 as a whole.

Edge sections opposite to each of the base portion 101 of the cylindrical inner circumferential surface section 102c and the R chamfered section 102e are connected to a front end surface section 102f which is at the opposite side with respect to the base portion 101 of the inner circumferential lip portion 102. The front end surface section 102f is parallel to a surface perpendicular to an axis of the piston seal 45, and has a constant width in the radial direction of the piston seal 45 with a constant inner diameter and a constant outer diameter. The front end surface section 102f forms an annular shape about the central axis of the piston seal 45.

Here, in the inner circumferential lip portion 102, a boundary portion between the diameter-reduced inner circumferential surface section 102a and the diameter-increased inner circumferential surface section 102b becomes a minimum diameter section 106 in which an inner diameter is a smallest diameter. In the inner circumferential lip portion 102, a portion between the base portion 101 and the minimum diameter section 106 becomes a front thick section 107 having a thickness increased as being spaced apart from the base portion 101 in the axial direction, and a position of the minimum diameter section 106 in the axial direction has a largest thickness. In addition, in the inner circumferential lip portion 102, a portion of the diameter-increased inner circumferential surface section 102b in the axial direction becomes a front thin section 108 having a thickness reduced as being spaced apart from the base portion 101, and a portion of the cylindrical inner circumferential surface section 102c in the axial direction becomes a front end section 109 having a constant thickness except for the R chamfered section 102e.

The outer circumferential lip portion 103 forms a tapered shape having a diameter increased as being spaced apart from the base portion 101 in the axial direction as a whole. A diameter-increased inner circumferential surface section 103a and a cylindrical inner circumferential surface section 103b are formed at the inner circumferential side of the outer circumferential lip portion 103 in sequence from the base portion 101 side in the axial direction. The diameter-increased inner circumferential surface section 103a extends to form a tapered shape about the central axis of the piston seal 45 to become a large diameter (i.e., the diameter is increased) as being spaced apart from the base portion 101 in the axial direction. The cylindrical inner circumferential surface section 103b extends from an edge section, which is an opposite side of the base portion 101 of the diameter-increased inner circumferential surface section 103a, to form a cylindrical surface shape about the central axis of the piston seal 45.

A diameter-increased outer circumferential surface section 103c, a cylindrical outer circumferential surface section 103d, a stepped surface section 103e and a cylindrical outer circumferential surface section 103f are formed at an outer circumferential side of the outer circumferential lip portion 103 in sequence from the base portion 101 side in the axial direction. The diameter-increased outer circumferential surface section 103c extends to form a tapered shape about the central axis of the piston seal 45 to have a diameter increased as being spaced apart from the base portion 101 in the axial direction. The cylindrical outer circumferential surface section 103d extends from an edge section, which is an opposite side of the base portion 101 of the diameter-increased outer circumferential surface section 103c, to form a cylindrical surface shape about the central axis of the piston seal 45. The stepped surface section 103e extends from an edge section, which is an opposite side of the base portion 101 of the cylindrical outer circumferential surface section 103d, inward in the radial direction to be parallel to a surface perpendicular to an axis of the piston seal 45. The cylindrical outer circumferential surface section 103f extends from an inner circumferential edge section of the stepped surface section 103e to form a cylindrical surface shape about the central axis of the piston seal 45. Edge sections of the cylindrical inner circumferential surface section 103b and the cylindrical outer circumferential surface section 103f which are opposite to the base portion 101 are connected to an front end surface section 103g of the outer circumferential lip portion 103 opposite to the base portion 101. The front end surface section 103g is formed to be parallel to a surface perpendicular to the axis of the piston seal 45, has a constant width in the radial direction of the piston seal 45 with a constant inner diameter and a constant outer diameter, and forms an annular shape about the central axis of the piston seal 45.

Here, in the outer circumferential lip portion 103, a portion of the cylindrical outer circumferential surface section 103f has a thin section 112 having a smaller thickness in the radial direction than a remaining main body section 111 in the outer circumferential lip portion 103.

A diameter-increased inner circumferential surface section 104a and an R chamfered section 104b are formed at the inner circumferential side of the intermediate protrusion portion 104 in sequence from the base portion 101 side in the axial direction. The diameter-increased inner circumferential surface section 104a extends to form a tapered shape about the central axis of the piston seal 45 to have a diameter slightly increased as being spaced apart from the base portion 101 in the axial direction. The R chamfered section 104b extends to be inclined with respect to the central axis of the piston seal 45 to have a diameter increased as being spaced apart from an edge section, which is an opposite side of the base portion 101 of the diameter-increased inner circumferential surface section 104a, in the axial direction. The R chamfered section 104b forms an arc shape in which a cross-sectional shape including the central axis of the piston seal 45 has a center inside the intermediate protrusion portion 104. The R chamfered section 104b forms an annular shape about the central axis of the piston seal 45 as a whole.

A diameter-reduced outer circumferential surface section 104c and an R chamfered section 104d are formed at an outer circumferential side of the intermediate protrusion portion 104 in sequence from the base portion 101 side in the axial direction. The diameter-reduced outer circumferential surface section 104c extends to form a tapered shape about the central axis of the piston seal 45 to have a diameter slightly reduced as being spaced apart from the base portion 101 in the axial direction. The R chamfered section 104d extends to be inclined with respect to the central axis of the piston seal 45 to have a diameter reduced as being spaced apart from an edge section, which is an opposite side of the base portion 101 of the diameter-reduced outer circumferential surface section 104c, in the axial direction. The R chamfered section 104d forms an arc shape in which a cross-sectional shape including the central axis of the piston seal 45 has a center inside the intermediate protrusion portion 104. The R chamfered section 104d forms an annular shape about the central axis of the piston seal 45 as a whole.

Edge sections of the R chamfered sections 104b and 104d which are opposite to the base portion 101 are connected to an front end surface section 104e of the intermediate protrusion portion 104 opposite to the base portion 101. The front end surface section 104e is formed to be parallel to a surface perpendicular to the axis of the piston seal 45, and has a constant width in the radial direction of the piston seal 45 with a constant inner diameter and a constant outer diameter. The front end surface section 104e also has an annular shape about the central axis of the piston seal 45. Further, positions, in the axial direction of the piston seal 45, of the front end surface section 104e of the intermediate protrusion portion 104 and the front end surface section 102f of the inner circumferential lip portion 102 coincide with each other, and the front end surface section 103g of the outer circumferential lip portion 103 is disposed closer to the base portion 101 than these positions.

The base portion 101 side of the diameter-reduced outer circumferential surface section 102d of the inner circumferential lip portion 102 and the base portion 101 side of the diameter-increased inner circumferential surface section 104a of the intermediate protrusion portion 104 are connected to each other at a curved surface section 114. The curved surface section 114 forms an arc shape in which a cross-sectional shape including the central axis of the piston seal 45 has a center in a space between the inner circumferential lip portion 102 and the intermediate protrusion portion 104. In addition, the diameter-increased inner circumferential surface section 103a of the outer circumferential lip portion 103 and the base portion 101 side of the diameter-reduced outer circumferential surface section 104c of the intermediate protrusion portion 104 are connected to each other at a curved surface section 115. The curved surface section 115 forms an arc shape in which a cross-sectional shape including the central axis of the piston seal 45 has a center in a space between the outer circumferential lip portion 103 and the intermediate protrusion portion 104. Bottom positions of the curved surface sections 114 and 115 constitute the base portion 101. Accordingly, in the base portion 101, base end portions of the inner circumferential lip portion 102 and the intermediate protrusion portion 104 are increased in thickness in the axial direction, and a base end portion of the outer circumferential lip portion 103 is reduced in thickness in the axial direction.

Figure 4B:
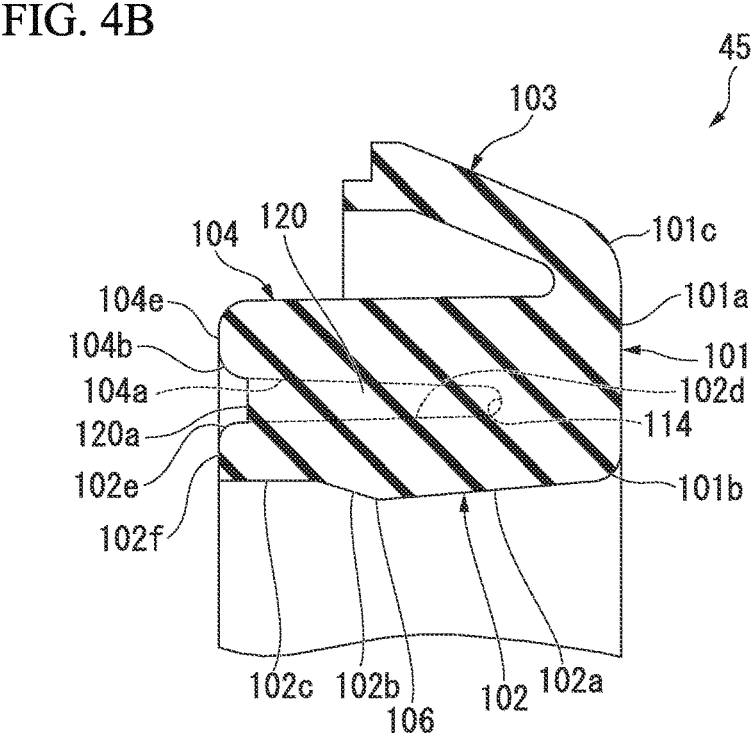
FIG. 4B is a cross-sectional view taken along line B-B of FIG. 3A, showing the piston seal of the master cylinder of the embodiment of the present invention.

Then, in the embodiment, as shown in FIG. 4B, a connecting portion 120 configured to connect the inner circumferential lip portion 102 and the intermediate protrusion portion 104 is installed between the inner circumferential lip portion 102 and the intermediate protrusion portion 104. As shown in FIG. 3A, the plurality of (specifically, eight) connecting portions 120 form an arc shape about the central axis of the piston seal 45, and are formed in the circumferential direction of the piston seal 45, i.e., in the circumferential direction of the base portion 101 at equal intervals. As a result, a portion between the inner circumferential lip portion 102 and the intermediate protrusion portion 104, in which the connecting portion 120 is not formed, becomes a slit 121. The plurality of (specifically, eight) slits 121 also form an arch shape about the central axis of the piston seal 45, and are formed in the circumferential direction of the piston seal 45, i.e., in the circumferential direction of the base portion 101 at equal intervals. A length in the circumferential direction of the slit 121 is larger than a length in the circumferential direction of the connecting portion 120. In other words, a central angle formed in a fan shape by connecting both ends in the circumferential direction of the slit 121 to a center of the piston seal 45 is larger than a central angle formed in a fan shape by connecting both ends in the circumferential direction of the connecting portion 120 to the center of the piston seal 45.

The connecting portion 120 has an front end surface section 120a opposite to the base portion 101 and parallel to a surface perpendicular to the axis of the piston seal 45, and has a constant width in the radial direction of the piston seal 45 with a constant inner diameter and a constant outer diameter. The connecting portions 120 are inclined to form line symmetry with respect to a line parallel to the central axis of the piston seal 45 passing through centers of the connecting portions 120 such that intervals are reduced as a pair of side surface sections 120b of both sides in the circumferential direction of the front end surface section 120a having the arc shape are spaced apart from the base portion 101.

As shown in FIG. 4B, the connecting portion 120 is integrated with the diameter-reduced outer circumferential surface section 102d of the inner circumferential lip portion 102, the diameter-increased inner circumferential surface section 104a of the intermediate protrusion portion 104, and the curved surface section 114 therebetween. More specifically, the connecting portion 120 is integrated with the curved surface section 114 throughout the entire length in the axial direction and the radial direction of the piston seal 45, and also integrated with the diameter-reduced outer circumferential surface section 102d and the diameter-increased inner circumferential surface section 104a throughout the substantially entire length in the axial direction of the piston seal 45. That is, the connecting portion 120 is formed to extend in the axial direction of the piston seal 45, and extends from the base portion 101 in a protruding front end direction of the intermediate protrusion portion 104 and the inner circumferential lip portion 102 in the axial direction of the piston seal 45. The front end surface section 120a of the connecting portion 120 extends closer to an opposite side of the base portion 101 than the minimum diameter section 106 of the inner circumferential lip portion 102, and extends to an intermediate position in the axial direction of the cylindrical inner circumferential surface section 102c.

Next, the piston seal 45 in a basic state (a non-braking state before the brake pedal is manipulated) in appropriate contact with the intermediate position in the axial direction of the cylindrical surface section 75a of the stepped section 75 of the primary piston 18 assembled into the circumferential groove 32 of the cylinder main body 15 and spaced apart from the circumferential wall 90 of the bottom section 13 side (the left side in FIG. 2) of the circumferential groove 32 will be mainly described with reference to FIG. 2.

When in the basic state, the piston seal 45 is disposed closest to the opening section 16 (the right side in FIG. 2) of the cylinder main body 15 in a posture in which the base portion 101 is parallel to a surface perpendicular to the cylinder axis. Accordingly, the base portion 101 is disposed opposite to the circumferential wall 89 of the circumferential groove 32, and abuts the flat surface section 89a of the circumferential wall 89 in the rear surface section 101a. In addition, the inner circumferential lip portion 102 disposed at the innermost circumferential side comes in contact with the cylindrical surface section 75a of the stepped section 75 in the outer circumferential surface 18a of the primary piston 18 in the inner circumferential portion. Here, in the inner circumferential lip portion 102, the diameter-reduced inner circumferential surface section 102a and portion of the diameter-increased inner circumferential surface section 102b adjacent to the diameter-reduced inner circumferential surface section 102a shown in FIGS. 4A and 4B come in contact with the cylindrical surface section 75a shown in FIG. 2, and are deformed into a cylindrical surface shape having a larger diameter than before being deformed according to the cylindrical surface section 75a. Accordingly, as the inner circumferential lip portion 102 comes in contact with the cylindrical surface section 75a with interference, at this time, the minimum diameter section 106 having a smallest inner diameter becomes a maximum interference area in which interference with respect to the cylindrical surface section 75a is maximized. Then, the connecting portion 120 is formed according to an extension to the minimum diameter section 106 that becomes the maximum interference area.

In addition, when in the basic state, in the piston seal 45, the cylindrical inner circumferential surface section 102c and the portion of the diameter-increased inner circumferential surface section 102b adjacent to the cylindrical inner circumferential surface section 102c are spaced apart from the cylindrical surface section 75a of the piston 18 in the cylinder radial direction to form a gap section 125 between the cylindrical surface section 75a and the surface sections. The gap section 125 forms an annular shape about the central axis of the piston seal 45, and is penetrating toward the bottom section 13 side (the left side in FIG. 2) in the cylinder axial direction. Then, the connecting portion 120 extends to be closer to an opposite side of the base portion 101 than an end section position of the base portion 101 side of the gap section 125.

In addition, when in the basic state, in the piston seal 45, the outer circumferential lip portion 103 serving as the outermost circumferential side abuts the groove bottom section 88 of the circumferential groove 32 in the cylindrical outer circumferential surface section 103d of the outermost circumferential side. In addition, at this time, the intermediate protrusion portion 104 is in the same state as the natural state, and the front end surface section 104e is parallel to a surface perpendicular to the cylinder axis. The intermediate protrusion portion 104 extends to become closer to the bottom section 13 (the left side in FIG. 2) of the cylinder main body 15 than the outer circumferential lip portion 103 with the same length as the inner circumferential lip portion 102.

Here, when in the basic state, in the intermediate protrusion portion 104, the entire front end surface section 104e matches a position in the cylinder radial direction to the flat surface section 90a of the circumferential wall 90 of the circumferential groove 32. The intermediate protrusion portion 104 is disposed to face the flat surface section 90a in the cylinder axial direction and abut the flat surface section 90a. However, here, the intermediate protrusion portion 104 is spaced apart from the circumferential wall 90 including the flat surface section 90a in the cylinder axial direction.

In addition, when in the basic state, the front end surface section 102f of the inner circumferential lip portion 102 matches a position in the cylinder radial direction to the tapered surface section 90b and the R chamfered section 90c of the circumferential wall 90 of the circumferential groove 32 and to the tapered surface section 75c of the stepped section 75 of the primary piston 18. The inner circumferential lip portion 102 is disposed to face the tapered surface section 90b, the R chamfered section 90c and the tapered surface section 75c. However, at this time, the inner circumferential lip portion 102 is spaced apart from the circumferential wall 90 including the tapered surface section 90b and the R chamfered section 90c in the cylinder axial direction, and also spaced apart from the tapered surface section 75c in the cylinder axial direction. In addition, here, the position in the cylinder radial direction of the front end surface section 102f of the inner circumferential lip portion 102 does not overlap the flat surface section 90a of the circumferential wall 90.

Further, when in the basic state, the front end surface section 120a of the connecting portion 120 matches the position in the cylinder radial direction to a boundary section 127 between the tapered surface section 90b of the circumferential wall 90 of the circumferential groove 32 and the flat surface section 90a closer to the groove bottom section 88 than the tapered surface section 90b of the circumferential wall 90. The front end surface section 120a is disposed to face the boundary section 127 in the cylinder axial direction. In other words, the front end surface section 120a of the connecting portion 120 is disposed to match the position in the cylinder radial direction to both of the tapered surface section 90b and the flat surface section 90a, and face both of the tapered surface section 90b and the flat surface section 90a in the cylinder axial direction.

When there is no input from the brake pedal side (not shown) and the primary piston 18 is at a basic position (a non-braking position) at which the port 76 is opened in the opening groove 47 as shown in FIG. 2, the piston seal 45 is configured such that inner circumferential portions of the inner circumferential lip portion 102 and the base portion 101 are disposed at a position of the cylindrical surface section 75a of the stepped section 75 of the primary piston 18, and the inner circumferential portion of the base portion 101 overlaps the position in the cylinder axial direction at a portion of the port 76.

Figure 5A:
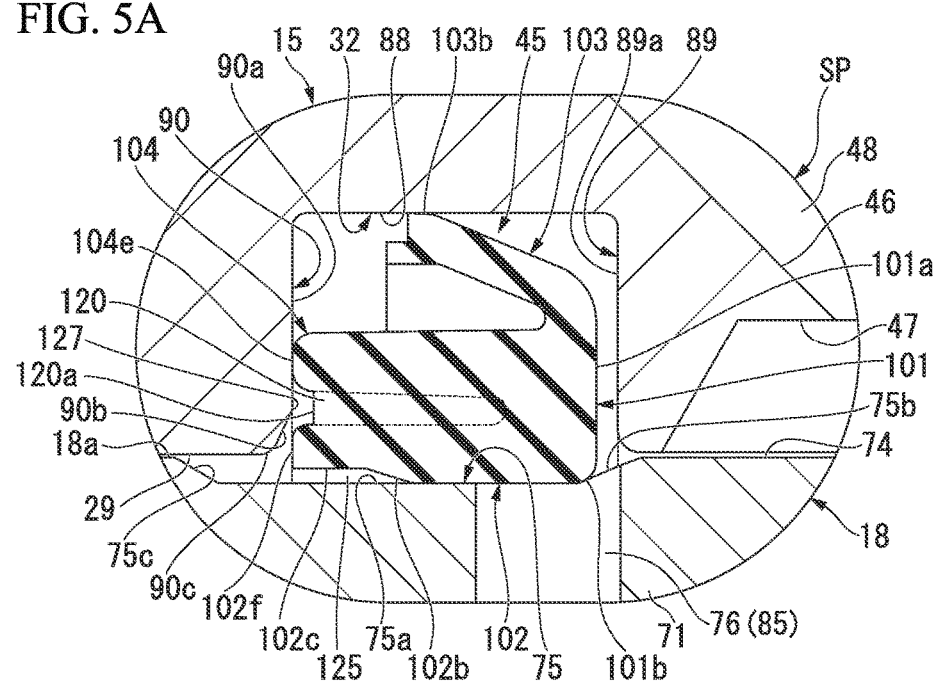
FIG. 5A is a partially enlarged cross-sectional view showing the major part of the master cylinder of the embodiment of the present invention, showing a state of an initial moving period of the piston.

Then, when there is an input from the brake pedal side and the primary piston 18 is moved toward the bottom section 13 (a left side in FIGS. 5A and 5B) of the cylinder main body 15 as shown in FIG. 5A, the primary piston 18 abuts the R chamfered section 101b of the base portion 101 of the piston seal 45 to press the piston seal 45 at the tapered surface section 75b of the stepped section 75 (a right side of FIGS. 5A and 5B) adjacent to the opening section 16 of the cylinder main body 15. Then, the piston seal 45 integrally moves with the primary piston 18, and as a result, as shown in FIG. 5A, the piston seal 45 is moved in the circumferential groove 32 toward the circumferential wall 90, and the base portion 101 is spaced apart from the circumferential wall 89. At the same time, the front end surface section 104e of the intermediate protrusion portion 104 abuts the flat surface section 90a of the circumferential wall 90.

When the primary piston 18 is further moved toward the bottom section 13 (the left side in FIGS. 5A and 5B) of the cylinder main body 15, while the inner circumferential lip portion 102 receives a force moved with the primary piston 18, the intermediate protrusion portion 104 abutting the circumferential wall 90 of the circumferential groove 32 pulls the inner circumferential lip portion 102 connected via the connecting portion 120 in order to suppress movement thereof. Accordingly, the inner circumferential lip portion 102 is suppressed from entering a gap between the stepped section 75 of the primary piston 18 and the sliding inner diameter section 29 of the cylinder main body 15 and being engaged therewith.

Figure 5B:
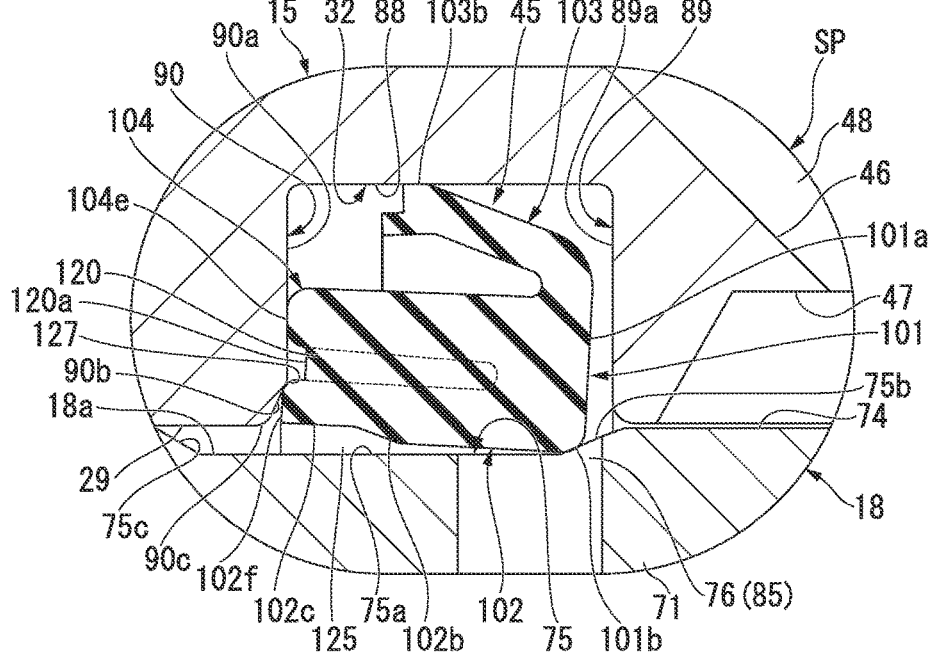
FIG. 5B is a partially enlarged cross-sectional view showing the major part of the master cylinder of the embodiment of the present invention, showing a state after that of FIG. 5A.

Additionally, at this time, in the piston seal 45, while the R chamfered section 101b of the base portion 101 pressed against the tapered surface section 75b with respect to the intermediate protrusion portion 104, which is abutting the flat surface section 90a of the circumferential wall 90 to be in a substantially stopped state, is moved toward the bottom section 13 (the left side in FIGS. 5A and 5B) of the cylinder main body 15, a moment of force in a direction of moving the front end surface section 104e side of the intermediate protrusion portion 104 toward the groove bottom section 88 is generated in the piston seal 45 about the R chamfered section 101b of the base portion 101. As a result, as shown in FIG. 5B, the front end surface section 104e of the intermediate protrusion portion 104 is slightly rotated to approach the groove bottom section 88. Even at this time, the inner circumferential lip portion 102 connected to the intermediate protrusion portion 104 via the connecting portion 120 is pulled by the intermediate protrusion portion 104 to be moved therewith, is spaced apart from the stepped section 75 of the primary piston 18 in the radial direction, abuts the flat surface section 90a side of the tapered surface section 90b, and is disposed more outside in the radial direction than the sliding inner diameter section 29 of the cylinder main body 15 while suppressing a contact with the circumferential wall 90 at the tapered surface section 90b. Accordingly, the inner circumferential lip portion 102 can be further suppressed from entering a gap between the stepped section 75 of the primary piston 18 and the sliding inner diameter section 29 of the cylinder main body 15.

When the primary piston 18 is further moved toward the bottom section 13 (the left side in FIGS. 5A and 5B) of the cylinder main body 15, movement of the piston seal 45 is restricted while maintaining a state in which the intermediate protrusion portion 104 abuts the flat surface section 90a of the circumferential wall 90. For this reason, the piston seal 45 rides over the tapered surface section 75b of the stepped section 75 to close the port 76, beyond the port 76, and blocks communication between the primary pressure chamber 85 and the primary supply path 48. Further, in a range, including the position, in which the primary piston 18 is disposed at the bottom section 13 side (the left side of FIGS. 5A and 5B) of the cylinder main body 15 from the position, the piston seal 45 blocks a space between the primary pressure chamber 85 and the primary supply path 48 to seal the primary pressure chamber 85. In this state, basically, a liquid pressure in the primary pressure chamber 85 becomes larger than a liquid pressure at atmospheric pressure in the primary supply path 48, and the brake liquid in the primary pressure chamber 85 is supplied from the primary outlet 27 shown in FIG. 1 into the braking cylinder of the wheel side.

After closing of the port 76, when the primary piston 18 is further moved toward the bottom section 13 side (the left side in FIGS. 5A and 5B) of the cylinder main body 15, the base portion 101 of the piston seal 45 climbs over the tapered surface section 75b to ride on the outer diameter section 74. The inner circumferential lip portion 102 rides on the tapered surface section 75b at this time, and then, the inner circumferential lip portion 102 rides on the outer diameter section 74. Then, the piston seal 45 is moved toward the circumferential wall 89 in the circumferential groove 32 according to the increase in liquid pressure in the primary pressure chamber 85. Accordingly, the base portion 101 abuts the circumferential wall 89 in the rear surface section 101a while the intermediate protrusion portion 104 and the inner circumferential lip portion 102 are spaced apart from the circumferential wall 90.

When the brake pedal (not shown) is started to return in order to release the braking from a state in which the primary piston 18 is moved at the bottom section 13 (the left side in FIGS. 5Aa and 5B) side of the cylinder main body 15 as described above, the primary piston 18 starts to return to the basic position as shown in FIG. 2 by the interval adjustment unit 79 which is shown in FIG. 1. A capacity of the primary pressure chamber 85 is increased by movement of the primary piston 18. At this time, when recovery of the brake liquid via the brake pipe cannot follow the increase in capacity of the primary pressure chamber 85, after the liquid pressure in the primary pressure chamber 85 is equalized to the liquid pressure at atmospheric pressure in the primary supply path 48, the liquid pressure in the primary pressure chamber 85 becomes a negative pressure, and the liquid pressure in the primary pressure chamber 85 becomes smaller than the liquid pressure at atmospheric pressure in the primary supply path 48. Then, the outer circumferential lip portion 103 is deformed to be spaced apart from the groove bottom section 88 while the negative pressure in the primary pressure chamber 85 causes the outer circumferential lip portion 103 side of the base portion 101 of the piston seal 45 to be deformed to be spaced apart from the circumferential wall 89. Accordingly, a gap can be formed between the circumferential groove 32 and the piston seal 45, and the brake liquid is supplied from the primary supply path 48 into the primary pressure chamber 85 via a flow path of the gap. Accordingly, the liquid pressure in the primary pressure chamber 85 can be restored to the atmospheric pressure from the negative pressure state.

Here, when setting the connecting portion 120 to the piston seal 45, it is preferable to set a formation angle θ about the central axis of the piston seal 45 of the slit 121 shown in FIG. 3A by using the following equation.

$$\theta \leq (360/(D*\pi))*((384*\delta max*E*I)/5(W/(b*L)))^{1/4}$$

In the above-mentioned equation, δmax represents allowable displacement that the inner circumferential lip portion 102 is pushed down in an inner radial direction, W represents a reaction force in the radial direction applied to a width of the slit 121 of the inner circumferential lip portion 102 when sliding on the tapered surface section 75b, L represents a width (L=D*π*θ/360) of the slit 121, b represents a length in the axial direction of the inner circumferential lip portion 102, H represents a height in the radial direction of the inner circumferential lip portion 102, D represents a diameter of a contact position of the piston seal 45 of the tapered surface section 75b of the primary piston 18, I represents a cross-section secondary moment (I=bh³/12), and E represents a Young's modulus.

In the master cylinder disclosed in the above-mentioned Patent Literature 1, the piston seal which slidingly contact with the piston is disposed in the circumferential groove of the cylinder main body. In the master cylinder, a member having an annular base portion, an inner circumferential lip portion protruding from an inner circumferential side of the base portion to come in sliding contact with an outer circumferential surface of the piston, an outer circumferential lip portion protruding from an outer circumferential side of the base portion to come in contact with a circumferential groove of a cylinder main body, and an intermediate protrusion portion protruding from a space between an inner circumferential lip portion and an outer circumferential lip portion of the base portion further than the outer circumferential lip portion is used as the piston seal. In addition, in the master cylinder disclosed in the above-mentioned Patent Literature 2, a cup-shaped seal having an annular base portion and an inner circumferential lip portion and an outer circumferential lip portion protruding from inner and outer circumferences of the base portion is installed in an annular groove of the piston, and a sliding ring slidably moving in the cylinder hole is installed between the cup-shaped seal of the annular groove and the cylinder hole of the cylinder main body.

In the master cylinder disclosed in Patent Literature 1, when the piston is moved, the piston seal may be moved with the piston and the inner circumferential lip portion may enter the gap between the piston and the cylinder main body. On the other hand, according to the master cylinder 11 of the above-mentioned embodiment, since the connecting portion 120 configured to connect the inner circumferential lip portion 102 and the intermediate protrusion portion 104 is installed at the piston seal 45 which is installed in the circumferential groove 32 of the cylinder main body 15, even when the inner circumferential lip portion 102 is moved with the primary piston 18, the intermediate protrusion portion 104 abutting the circumferential wall 90 of the circumferential groove 32 pulls the inner circumferential lip portion 102 to suppress movement thereof. Accordingly, the inner circumferential lip portion 102 can be suppressed from entering the gap between the primary piston 18 and the cylinder main body 15, and influence on the piston seal 45 by movement of the primary piston 18 can be suppressed.

Further, in the master cylinder disclosed in Patent Literature 2, while a thick portion is formed at the base portion, the inner circumferential lip portion and the outer circumferential lip portion do not come in sliding contact with the cylinder main body or the piston, and thus, the thick portion does not contribute to an influence on the cup-shaped seal by movement of the piston.

In addition, according to the master cylinder 11 of the embodiment, since the plurality of connecting portions 120 are installed in the circumferential direction of the base portion 101 at intervals, a decrease in flexibility of the inner circumferential lip portion 102 can be suppressed.

In addition, since the connecting portion 120 is formed to extend from the base portion 101 to the front end direction of the intermediate protrusion portion 104, formation thereof becomes easy.

In addition, the front end of the connecting portion 120 is disposed to face the boundary section 127 between the tapered surface section 90b and the flat surface section 90a. For this reason, the inner circumferential lip portion 102 can face the tapered surface section 90b, and can secure a distance between the inner circumferential lip portion 102 and the circumferential wall 90.

In addition, the connecting portion 120 is formed to extend to the minimum diameter section 106 serving as the maximum interference area of the inner circumferential lip portion 102. For this reason, stiffness of the minimum diameter section 106 can be increased at the connecting portion 120, and a surface pressure to the primary piston 18 of the inner circumferential lip portion 102 can be increased.

Figure 6:
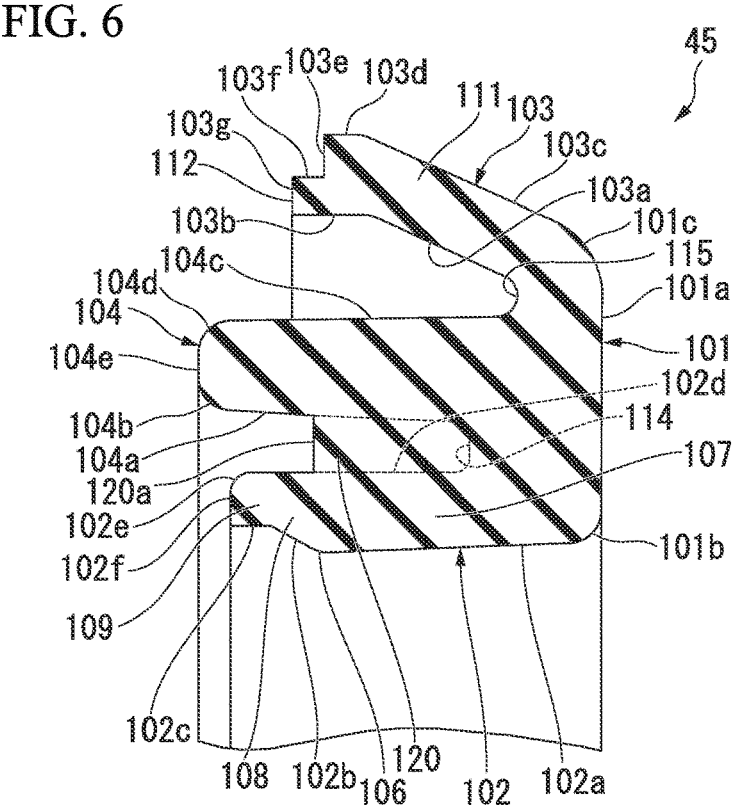
FIG. 6 is a cross-sectional view showing a variant of the piston seal.
Figure 7:
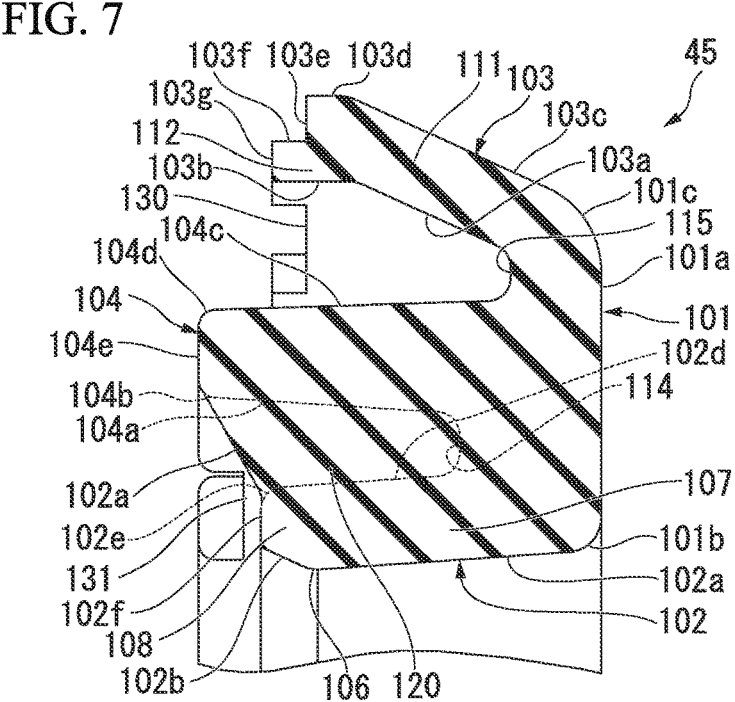
FIG. 7 is a cross-sectional view showing a variant of the piston seal.

Here, the piston seal 45 may be partially modified as shown in FIGS. 6 and 7. That is, as shown in FIG. 6, it is possible to reduce a protrusion length from the base portion 101 of the inner circumferential lip portion 102 to be smaller than the intermediate protrusion portion 104, or shorten the connecting portion 120 to a position of the minimum diameter section 106 side of the diameter-increased inner circumferential surface section 102b. Further, even when the connecting portion 120 is shortened, it is preferable to make the connecting portion 120 extend to at least the position of the minimum diameter section 106.

In addition, as shown in FIG. 7, it is also possible to extend the connecting portion 120 to positions of the front end surface section 102f of the inner circumferential lip portion 102 and the front end surface section 104e of the intermediate protrusion portion 104, remove the front end section 109 having a substantially constant thickness of the inner circumferential lip portion 102, form a slit 130 passing through the thin section 112 of the outer circumferential lip portion 103 in the radial direction, or form a slit 131 passing through the end section of the intermediate protrusion portion 104 which is opposite to the base portion 101 in the radial direction by reducing the protrusion length from the base portion 101 of the inner circumferential lip portion 102 to be smaller than the intermediate protrusion portion 104. Further, when the connecting portion 120 is extended to the positions of the front end surface section 102f of the inner circumferential lip portion 102 and the front end surface section 104e of the intermediate protrusion portion 104, and when the front end surface sections 102f and 104e are offset in the axial direction, the front end surface section 120a of the connecting portion 120 forms a tapered surface shape.

Further, as the slit 130 passing through the thin section 112 of the outer circumferential lip portion 103 in the radial direction is formed or the slit 131 is formed at the end section of the intermediate protrusion portion 104 which is opposite to the base portion 101, when the above-mentioned braking is released, a wider flow path can be formed between the circumferential wall 89 and the piston seal 45, and the brake liquid of the primary supply path 48 can be smoothly supplied into the primary pressure chamber 85.

Further, in the above-mentioned embodiment, while the seal structure SP of the primary side has been exemplarily described in detail, since the seal structure SS of the secondary side also has the same structure, the same effect can be exhibited, and the same modification becomes possible.

The above-mentioned embodiment provides a master cylinder including a cylinder main body in a bottomed cylindrical shape including an outlet of a brake liquid and a supply path which is in communication with a reservoir, a piston that is movably disposed in the cylinder main body and that is configured to form a pressure chamber which is capable to supply a liquid pressure into the outlet between the cylinder main body and the piston, and a piston seal that is installed in a circumferential groove formed in the cylinder main body and that is configured to seal a space between the supply path and the pressure chamber by bringing an inner circumference in sliding contact with the piston, the piston seal including an annular base portion, an inner circumferential lip portion protruding from an inner circumferential side of the base portion to come in sliding contact with an outer circumferential surface of the piston, an outer circumferential lip portion protruding from an outer circumferential side of the base portion to come in contact with the circumferential groove of the cylinder main body, and an intermediate protrusion portion protruding from between the inner circumferential lip portion and the outer circumferential lip portion of the base portion further than the outer circumferential lip portion, wherein a connecting portion is formed to extend in an axial direction of the piston seal and is configured to connect the inner circumferential lip portion and the intermediate protrusion portion is formed between the inner circumferential lip portion and the intermediate protrusion portion. In this way, since the connecting portion configured to connect the inner circumferential lip portion and the intermediate protrusion portion is installed at the piston seal which is installed in the circumferential groove of the cylinder main body, even when the inner circumferential lip portion is moved with the piston, the intermediate protrusion portion abutting the circumferential wall of the circumferential groove pulls the inner circumferential lip portion to suppress movement thereof. Accordingly, the inner circumferential lip portion can be suppressed from entering between the cylinder main body and the piston by movement of the piston.

In addition, since the plurality of connecting portions are spaced apart from each other in the circumferential direction of the base portion, a decrease in flexibility of the inner circumferential lip portion can be suppressed.

In addition, since the connecting portion is formed to extend from the base portion in the front end direction of the intermediate protrusion portion, formation thereof becomes easy.

In addition, since the tapered surface section is formed at the opening side of the circumferential groove in the circumferential wall of the bottom section side of the cylinder main body of the circumferential groove, and a front end of the connecting portion is disposed to face the boundary section between the tapered surface section and the wall surface section which is closer to the bottom section side of the circumferential groove than the tapered surface section of the circumferential wall, the inner circumferential lip portion can face the tapered surface section, and a distance to the circumferential wall can be secured.

In addition, since the connecting portion extends to at least the maximum interference area of the inner circumferential lip portion, stiffness of the maximum interference area can be increased at the connecting portion, and a surface pressure to the piston of the inner circumferential lip portion can be increased.

INDUSTRIAL APPLICABILITY

According to the master cylinder of the present invention, the inner circumferential lip portion can be suppressed from entering between the cylinder main body and the piston by movement of the piston.

REFERENCE SIGNS LIST 11 master cylinder
12 reservoir
13 bottom section
15 cylinder main body
16 opening section
18 primary piston (piston)
18a outer circumferential surface
19 secondary piston (piston)
26 secondary outlet (outlet)
27 primary outlet (outlet)
30, 32 circumferential groove
35, 45 piston seal
38 secondary supply path (supply path)
48 primary supply path (supply path)
68 secondary pressure chamber (pressure chamber)
85 primary pressure chamber (pressure chamber)
88 groove bottom section (bottom section of circumferential groove)
90 circumferential wall (circumferential wall of bottom section side of cylinder main body)
90a flat surface section (wall surface section)
90b tapered surface section
101 base portion
102 inner circumferential lip portion
103 outer circumferential lip portion
104 intermediate protrusion portion
106 minimum diameter section (maximum interference area)
120 connecting portion
127 boundary section

The invention claimed is:

1. A master cylinder comprising:
a cylinder main body in a bottomed cylindrical shape including an outlet of a brake liquid and a supply path which is in communication with a reservoir,
a piston that is movably disposed in the cylinder main body and that is configured to form a pressure chamber which is capable of supplying a liquid pressure into the outlet between the cylinder main body and the piston, and
a piston seal that is installed in a circumferential groove formed in the cylinder main body and that is configured to seal a space between the supply path and the pressure chamber by bringing an inner circumference in sliding contact with the piston,
the piston seal comprising:
an annular base portion;
an inner circumferential lip portion protruding from an inner circumferential side of the base portion to come in sliding contact with an outer circumferential surface of the piston;
an outer circumferential lip portion protruding from an outer circumferential side of the base portion to come in contact with the circumferential groove of the cylinder main body; and
an intermediate protrusion portion protruding from between the inner circumferential lip portion and the outer circumferential lip portion of the base portion further than the outer circumferential lip portion,
wherein a connecting portion is configured to protrude toward a front end direction of the intermediate protrusion portion from the base portion in an axial direction of the piston seal and is configured to connect the inner circumferential lip portion and the intermediate protrusion portion and wherein the connecting portion is formed between the inner circumferential lip portion and the intermediate protrusion portion, and
wherein the connecting portion includes a plurality of circumferentially spaced apart sections in a circumferential direction of the base portion.

2. The master cylinder according to claim 1,
wherein a tapered surface section is formed at an opening side of the circumferential groove in a circumferential wall of a bottom section side of the cylinder main body in the circumferential groove, and
a front end of the connecting portion is disposed to face a boundary section between the tapered surface section and a wall surface section which is closer to a bottom section side of the circumferential groove than the tapered surface section of the circumferential wall.

3. The master cylinder according to claim 2,
wherein the connecting portion is formed to extend to at least a maximum interference area of the inner circumferential lip portion, the maximum interference area being an area in which an interference with respect to the outer circumferential surface of the piston is maximized.

4. The master cylinder according to claim 1,
wherein the connecting portion is formed to extend to at least a maximum interference area of the inner circumferential lip portion, the maximum interference area being an area in which an interference with respect to the outer circumferential surface of the piston is maximized.

5. The master cylinder according to claim 1,
wherein a tapered surface section is formed at an opening side of the circumferential groove in a circumferential wall of a bottom section side of the cylinder main body in the circumferential groove, and
a front end of the connecting portion is disposed to face a boundary section between the tapered surface section and a wall surface section which is closer to a bottom section side of the circumferential groove than the tapered surface section of the circumferential wall.

6. The master cylinder according to claim 1,
wherein the connecting portion is formed to extend to at least a maximum interference area of the inner circumferential lip portion, the maximum interference area being an area in which an interference with respect to the outer circumferential surface of the piston is maximized.

7. A master cylinder comprising:
a cylinder main body that is in a bottomed cylindrical shape including an outlet of a brake liquid and a supply path which is in communication with a reservoir and that is arranged to have a piston movably disposed inside thereof,
a piston seal that is installed in a circumferential groove formed in the cylinder main body, that includes an interference at an inner circumferential thereof, and that is configured to slidingly contact with an outer circumference of the piston,
the piston seal comprising:
an annular base portion;
an inner circumferential lip portion protruding from an inner circumferential side of the base portion to come in sliding contact with an outer circumferential surface of the piston;
an outer circumferential lip portion protruding from an outer circumferential side of the base portion to come in contact with the circumferential groove of the cylinder main body; and
an intermediate protrusion portion protruding from between the inner circumferential lip portion and the outer circumferential lip portion of the base portion further than the outer circumferential lip portion,
wherein a connecting portion that is configured to connect the inner circumferential lip portion and the intermediate protrusion portion is formed between the inner circumferential lip portion and the intermediate protrusion portion,
wherein the connecting portion is formed to protrude from the base portion toward a front end direction of the intermediate protrusion portion which is in an axis direction of the piston seal, and
wherein the connecting portion includes a plurality of circumferentially spaced apart sections in a circumferential direction of the base portion.

8. The master cylinder according to claim 7,
wherein the connecting portion is formed to extend to at least a maximum interference area of the inner circumferential lip portion, the maximum interference area being an area in which an interference with respect to the outer circumferential surface of the piston is maximized.

9. A master cylinder comprising:
a piston seal that is installed in a circumferential groove formed at an inner circumferential portion of the cylinder main body, the cylinder main body having a bottomed cylindrical shape and capable of having a piston movably disposed inside thereof, the piston seal comprising:

an annular base portion;

an inner circumferential lip portion that is protruding from an inner circumferential side of the base portion to come in sliding contact with an outer circumferential surface of the piston and that includes an interference;

an outer circumferential lip portion protruding from an outer circumferential side of the base portion to come in contact with the circumferential groove of the cylinder main body; and an intermediate protrusion portion protruding from between the inner circumferential lip portion and the outer circumferential lip portion of the base portion further than the outer circumferential lip portion, wherein a connecting portion that is configured to connect the inner circumferential lip portion and the intermediate protrusion portion is formed between the inner circumferential lip portion and the intermediate protrusion portion, and wherein the connecting portion is formed to protrude from the base portion to at least a maximum interference area of the inner circumferential lip portion which is in an axis direction of the piston seal, the maximum interference area being an area in which an interference with respect to the outer circumferential surface of the piston is maximized.

10. The master cylinder according to claim 9, wherein the connecting portion includes a plurality of circumferentially spaced apart sections in a circumferential direction of the base portion.

* * * * *